United States Patent [19]

Grosclaude et al.

[11] 4,131,688

[45] Dec. 26, 1978

[54] CONTINUOUS MANUFACTURE OF CHEESE

[75] Inventors: Gérard Grosclaude, Neauphle le Vieux; Jean Regnier, Issy les Moulineaux; Marcel Cavarroc, Velizy, all of France

[73] Assignee: Institut National de la Recherche Agronomique, Paris, France

[21] Appl. No.: 729,072

[22] Filed: Oct. 4, 1976

[30] Foreign Application Priority Data

Oct. 3, 1975 [FR] France .................. 75 30362

[51] Int. Cl.$^2$ ............................................. A23C 19/02
[52] U.S. Cl. ........................................ 426/40; 99/452; 99/453; 99/455; 426/36; 426/491; 426/516
[58] Field of Search ................. 426/36, 40, 582, 516, 426/491; 99/452, 453, 461

[56] References Cited

U.S. PATENT DOCUMENTS

| 2,781,269 | 2/1957 | Harper et al. | 426/36 |
| 3,481,747 | 12/1969 | Berge | 426/516 X |
| 3,518,094 | 6/1970 | Nikolic | 426/36 |
| 3,520,697 | 7/1970 | Berridge | 426/36 |
| 3,899,596 | 8/1975 | Stenne | 426/40 |

Primary Examiner—David M. Nafe
Attorney, Agent, or Firm—Oblon, Fisher, Spivak, McClelland & Maier

[57] ABSTRACT

A process and apparatus for the continuous manufacture of cheese starting with the ultrafiltration retentate of milk or a milk product until the solids content is approximately that of the desired cheese. Additional constituents such fat are added so that the resulting cheese precursor or precheese has solids content and fat to solids ratio substantially the same as the desired cheese. The cheese precursor is heated and mixed with rennet. The rate of flow of this mixture into a coagulation cylinder is controlled so that the flow in the coagulation cylinder is laminar throughout. The temperature of the cylinder wall is maintained slightly below that of entering mixture so as to obtain, in equilibrium, the formation of a coagulation front which is substantially plane and at right angles to the axis of the coagulation cylinder, thereby homogenizing the texture of the resulting curd. The cylinder cross section is approximately that of the desired cheese. The coagulation cylinder opens into a floatation tank which separates cut slices from the cylindrical mass of curd issuing from the cylinder. No treatment is required between the cutting of slices and ripening. The floatation liquid is also circulated through a shell around the cylinder to maintain its wall at the desired temperature. This process may be used for soft, semi-hard and hard cheeses but is particularly adapted to relatively small diameter cheese intended to be sold whole by the retailer.

8 Claims, 5 Drawing Figures

U.S. Patent  Dec. 26, 1978  Sheet 1 of 3  4,131,688
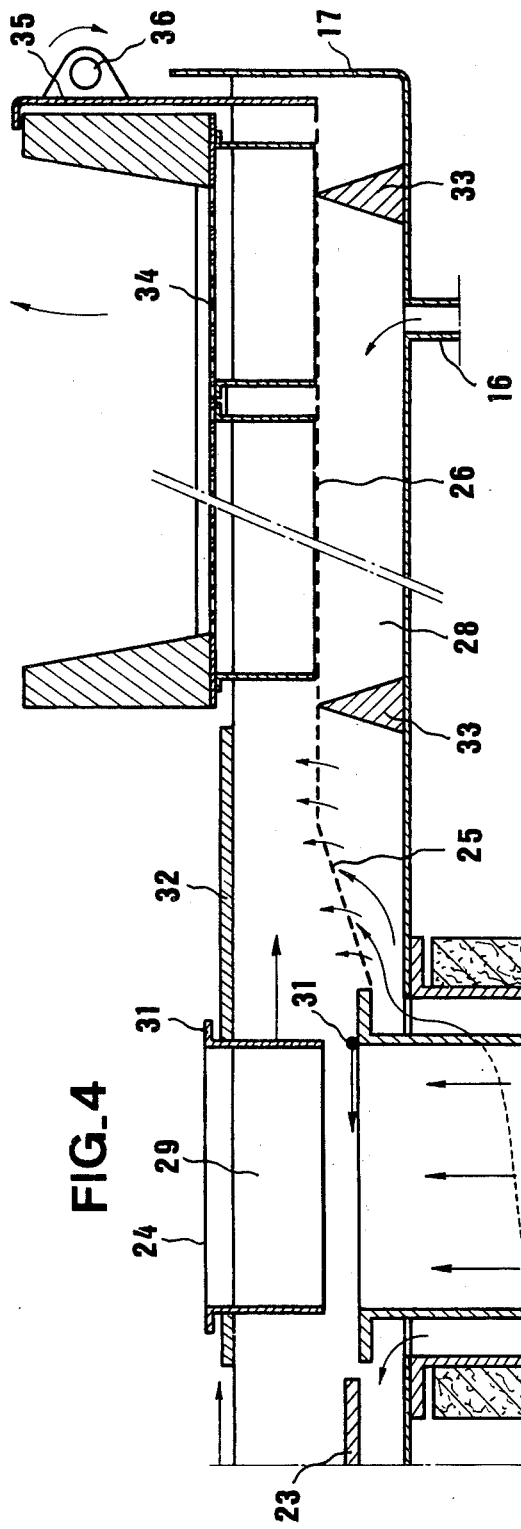
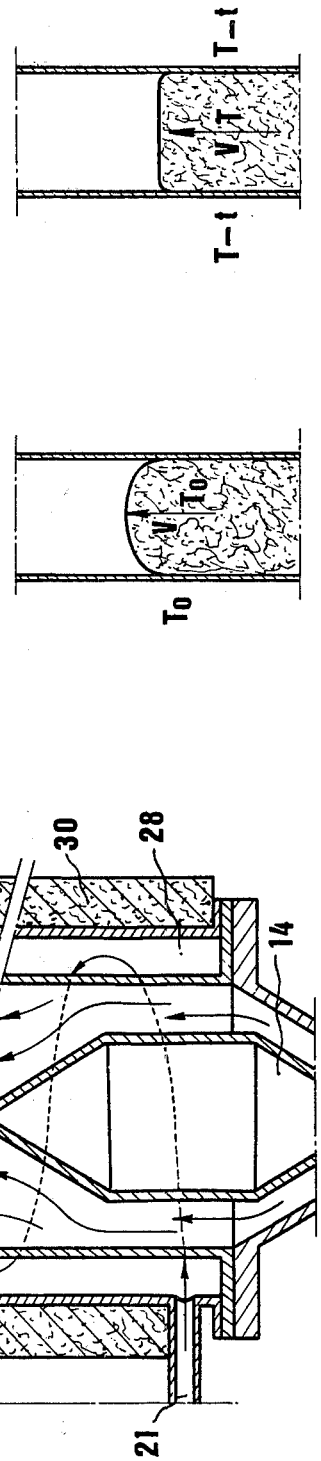
FIG.1
FIG.2
FIG.4

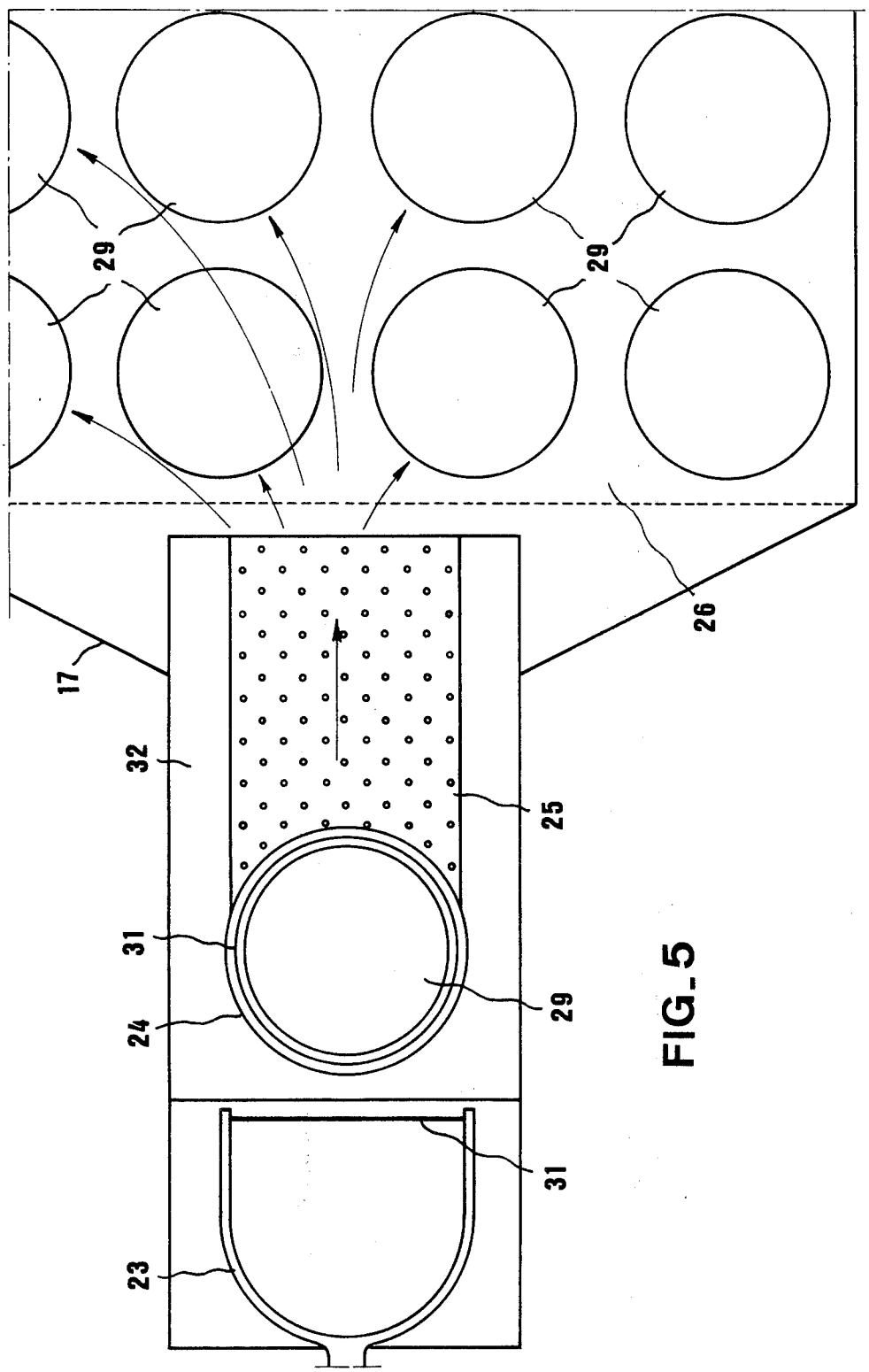

CONTINUOUS MANUFACTURE OF CHEESE

The present invention relates to a process and apparatus for the continuous manufacture of cheese.

The invention relates more particularly to the manufacture of cheeses intended to be sold whole by the retailer or to cheeses of larger size sold by weight, such as uncooked hard cheeses.

In modern methods of cheeses-marking which aim at reducing the labor force and regulating manufacture, it was first proposed to mechanize the manual operations of sclicing, mixing, drawing off, draining and pouring into the mold, then mechanization went on to the raw material, i.e., milk.

After the introduction of special tanks and centrifugal curd separators, a further step was made by using a special cylinder called a "coagulator" which made it possible to utilize so-called continuous processes such as the NIZO process (see. articles by J. UBBELS, Jt. van der LINDE and A. G. J. ARENTZEN of THE NETHERLANDS INSTITUTE OF DAIRY RESEARCH); and finally the FRENCH NATIONAL INSTITUTE OF AGRONOMICAL RESEARCH (see French patent no 69,24555 and its certificates of addition) a new process for treating milk by ultrafiltration in which the milk is forced through a semi-permeable membrane from which a filtered liquid known as the ultrafiltrate and a liquid held back or retained by the membrane called "retentate" are obtained, which have high milk solids content. This process constitutes an important advance in the preparation of the starting product for the manufacture of cheese.

No presently known continuous process makes a really continuous production possible from ultrafiltration of the milk to the molding of the cheese. In fact, for instance in the NIZO process, the mixture of milk and rennet is heated and conveyed continuously to a cylinder in which it coagulates; the curd is then cut at the exit and divided up to permit the separation of the whey, then washed and placed in a mold.

According to other processes, the liquid held back by ultrafiltration having less than 18% milk solids, is the starting material, which is introduced heated and mixed with rennet into a cylinder where it coagulates while it remains stationary, the coagulum then being forced out of the cylinder, cut and drained. In such a process the curd loses up to two thirds of its weight during draining, then it is molded.

Finally, it has already been envisaged to prepared curd in tubular enclosures where the product advances in a continuous manner, but owing to heating requirements, coupled with the effect on the movement of the product, one is limited to the use of coagulation cylinders of small diameter, whereby the slices of curd, cut at the outlet ends of the tubular enclosures, have a cross sectional area which is much too small to constitute directly a potential cheese.

It is an object of the invention to manufacture cheese continuously from an initial liquid suitably prepared, the resulting cheeses being obtained by directly ripening slices of curd issuing from a coagulation cylinder and having the ultimate shape, a solids content in the cheese and a fat to solids content ratio equal to that of the desired cheese composition. The separate operations of cutting, draining to eliminate whey and molding are eliminated.

With the present process and apparatus according to the invention the manufacture of cheese is simplified, accelerated and made really continuous from the initial step of treating the milk to the final step of ripening the curd.

According to the invention, there is provided a process for the continuous manufacture of cheese, comprising starting with a liquid called cheese precursor or precheese obtained by mixing conventional additives to the retentate from ultrafiltration of milk or a milk product capable of subsequently transformation into cheese, wherein the cheese precursor or precheese is heated, rennet added, and carried to an elongate coagulation zone; wherein the improvement comprises using a cheese precursor or precheese having characteristics such that the solids content and the ratio of fat to solids are substantially identical to those of the cheese to be manufactured, controlling the flow of the mixture of cheese precursor or precheese and rennet carried to the coagulation zone so as to be laminar at all points in the coagulation zone, maintaining the periphery of said coagulation zone at a temperature slightly lower than that of the inflowing mixture so as to obtain, in equilibrium, the formation of a substantially plane coagulation front coinciding with a cross sectional plane across the elongate coagulation zone and to homogenize the texture of the resulting curd.

A preferred embodiment of the process according to the invention comprises carrying out ultrafiltration of milk until the ultrafiltration retentate has a solids content in the vicinity of that of the cheese to be manufactured, adding additional constituents to said retentate to obtain a liquid called cheese precursor or precheese having characteristics such that the solids content and the ratio of fat to solids are substantially identical to those of the desired cheese intimately mixing rennet to the cheese precursor or precheese, heating the mixture to a temperature slightly above the selected temperature of coagulation, continuously introducing the heated mixture into a elongate cylinder having a smooth walled interior and a cross section substantially equal to that of the desired cheese, while controlling the inflow rate of the mixture so that the continuous flow of the mixture or mass inside the cylinder is laminar at all points; then producing a substantially plane coagulation front coinciding with a cross-sectional plane of the cylinder, while keeping the temperature of the wall of the cylinder slightly lower than the selected temperature of coagulation, cutting at the outlet end of the cylinder, slices of curd preshaped by the wall of the cylinder, transferring the preshaped curd slices towards a curing or ripening station, the slices having substantially the composition and shape of the desired cheese.

According to the invention, apparatus is provided for the continuous manufacture of cheese starting with a liquid called cheese precursor or precheese having a solids content and a fat to solids ratio substantially identical to those of the cheese to be manufactured, comprising at least one coagulation cylinder open at one end and connected to a mixer through a conduit at its other end, means for heating said cylinder, means for cutting slices of curd at the open end of said cylinder, means for pumping cheese precursor or precheese to the mixer, said cylinder being in permanent communication with said mixer and thermostatically controlled, the inner cross section of said cylinder being substantially that of the cheese to be manufactured.

The invention will now be described with reference to a preferred apparatus for manufacturing cheeses, given by way of non-limiting example, depicted in the accompanying schematic drawings.

FIGS. 1 and 2 schematically illustrate, respectively, a bell-shaped and a plane coagulation front in a coagulation cylinder;

FIG. 4 is a longitudinal cross section of part of the apparatus taken along the axis of the coagulation cylinder; and FIG. 5 is a schematic top plan view of the detail of FIG. 4 which shows means for cutting slices at the open, outlet end of the cylinder and for transferring slices of curd.

Figure 3:
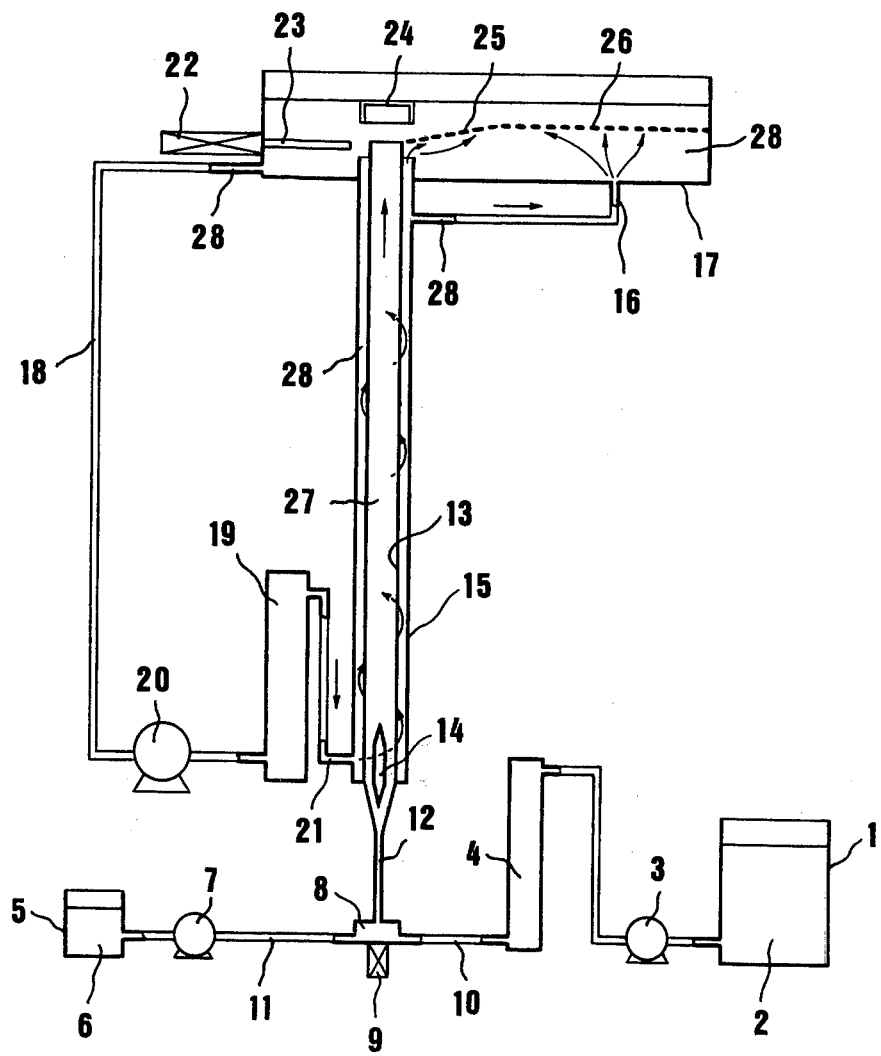
FIG. 3 is an overall diagram of the apparatus.

To attain the objects according to the invention, i.e., slices of curd having their ultimate shape, solids content and fat to solids ratio of the desired cheese, are obtained at the outlet end of a coagulation cylinder, such that the curd slices do not have to undergo any supplementary treatment between the cutting of the slices at the outlet of the cylinder and ripening, it is important to provide the coagulation cylinder with a starting liquid which already has a solids content and a proportion of fat to solids which is substantially identical to that of the desired cheese, and in addition the cross section of the coagulation cylinder must be substantially equal to that of the desired cheese. Now, since the solids content and the ratio of fat to solids to be introduced into the coagulation cylinder are relatively high, which gives the starting liquid a considerable viscosity, special measures must be taken to prevent boundary layer phenomena along the wall of the coagulation cylinder. Moreover, to avoid having cylinders which are too long, it is preferable to control the temperature of the cylinder wall to maintain a sufficient speed of coagulation of the advancing mass or mixture. Now, as the flow of the mixture is laminar, the coagulation front in movement takes on a bell-shaped configuration as shown diagrammatically in FIG. 1, the coagulation front separating from the mass of mixture (A) which is still liquid from the mass of the coagulated product (B), the combined mass advancing at a speed V in the cylinder heated externally to a temperature T which is, in equilibrium, the coagulation temperature of the mixture.

This bell-shaped coagulation front is detrimental to the texture of the resultant curd, at the outlet of the cylinder, and consequently to the ripened cheese, which explains, no doubt, why previous attempts in this direction failed. That is also the reason why in all cheese making operations where the mixture or mass advances while coagulating, either small diameter cylinders were used so that the texture of the curd remains substantially homogeneous in the mass, or the curd was broken up at the outlet of the coagulation cylinder to homogenize and drain the mass.

The present invention is therefore doubly meritorious in revealing the source of the problem and finding a solution by means described herein.

A first main point in the present process resides in the choice of the starting product and how it is obtained. This product which is referred to as cheese precursor or precheese, is the liquid rententate resulting from high pressure ultrafiltration operation, which operation is carried out until the liquid held back by the semi-permeable membrane has a solids content comparable to that of the cheese which is desired, this retentate has added to it fatty substances and conventional additives such as leaven so that the cheese precursor thus obtained has characteristics, namely solids content and the fat to solids ratio, substantially identical to those of the desired cheese. The cheese precursor is then heated to a temperature slightly above the temperature selected for coagulation and mixed intimately with rennet, then the liquid mixture is conveyed to coagulation cylinder having a smooth walled interior, the cross section of the coagulation cylinder is selected substantially the same as that of the desired cheese, which cross section may be circular, square, elliptical or the like depending on the cheese to be made. To achieve a homogeneous curd texture, it is essential that the flow of the liquid cheese precursor in the cylinder be laminar, which occurs by regulating the inflow of the mixture of cheese precursor and rennet into the cylinder so that this mixture proceeds very slowly, this slow speed of advance increasing, moreover, the stay time in the coagulation cylinder whereby the consistency of the coagulum or curd at the output is sufficient, without having to use inordinately long coagulation cylinders. It is important for the core or central zone of the product mass advancing through the coagulation cylinder to start coagulating before its peripheral zone so that the consistencies of the core and peripheral zones at a given longitudinal position attain the same degree, simultaneously, at the end of curdling and establish a plane coagulation front at right angles to the axis of the progressing mixture or mass, which homogenizes the curd texture.

In fact, a portion of the progressing cylindrical mass located at the periphery is subjected, in movement, to the effects of the adjacent wall which slows and retards its forward progression relative to a portion of the progressing cylindrical mass having the same viscosity but located in central or core zone of the mass, whereby, gradually, the peripheral and core portions, having the same viscosity, are eventually shifted in the direction of forward movement thereby causing the formation of a bell-shaped coagulation front, as shown in FIG. 1. On the other hand if the periphery of the cylindrical mass coagulates more slowly than the core zone and if the cylindrical mass is supplied at its periphery, the retarding effects can be cancelled so that a peripheral portion and a central portion of the same viscosity are at the same longitudinal position in the cylindrical mass at the end of coagulation and a plane coagulation front is established, as depicted in FIG. 2.

To effect this result the wall of the coagulation cylinder is maintained at a temperature T−t less than the temperature selected for coagulation whilst, as previously mentioned, the liquid cheese precursor flowing into the coagulation cylinder is at a temperature T above the coagulation temperature. The periphery of the cylindrical mass cools, then, along the cylinder, which slows the coagulation process relative to the coagulation in the center and thereby reduces the effects of the wall owing to lower viscosity, enabling peripheral portions and central portions of the same viscosity to come in alignment at right angles to the axis of the cylindrical mass. The offsetting of peripheral portions relative to central portions of equal viscosity is even further reduced by introducing mixture at the periphery of the coagulation cylinder, which accelerates the laminar flow of peripheral streamlets of mixture compared to those in the center of the progressive mass.

The curd issuing from the outlet end of the coagulation cylinder is a consistent cylindrical mass in the form of a sausage whose cross section is substantially that of the desired cheese and is of homogeneous texture, its solids content and its fat to solids ratio being substantially that of the desired cheese.

The coagulated cylindrical mass of curd is then cut in slices of equal thickness, slightly wider than that of the desired cheese to account for consolidation of the curd due to slight exuding before curing or ripening. If it is desired to keep the shape of the slices in perfect form, the sides thereof must be hooped by a hoop or ring of cross section practically equal to that of the final cheese.

The cutting is carried out at the desired height as a function of mixture of the volume introduced into the cylinder over a time period corresponding to the weight of cheese to be obtained, and to this end any feeler or position sensing means detecting the height of the slice may be employed.

When cutting the curd, it is important to separate quickly the slices of curd to prevent them from sticking back together. This may be effected by use of any quick lift mechanical means, but a floatation bath of liquid whose density is at least as great as that of the cut off slice of curd is preferred, so that slices are lifted by the effect of buoyancy. The liquid may be any appropriate liquid of suitable density; this choice of liquid should, however, be compatible with the product in preparation, i.e. the cheese prior to ripening. Thus, water will not be suitable by reason of its density and low osmotic pressure. Furthermore, a salty medium, such as brine, will not be suitable either, for it may cause the outside of the cheese to harden, which might interfere with curing or ripening. The presence of slight exuding of the cheese prior to ripening must also be taken into account.

Preferably the ultrafiltrate resulting from the previous ultrafiltration of milk is used, or even whey. So as to avoid undesirable bacteria development in the bath, the liquid may be pasteurized during operation and the pH may be lowered.

It is also advisable to use the same liquid for maintaining the wall of the coagulation cylinder at a temperature slightly less than the selected coagulation temperature, this liquid washing the wall and recycled, in continuous flow, from the slice floating tank over the cylinder wall, then back to the tank.

By the effect of buoyancy and floatation these freshly cut curd slices may be easily conveyed despite their fragility.

When the slices of curd are cut and, if desired, hooped in rings, they are carried away to an aeration or curing gase and transferred to a curing or ripening station.

To carry out the cheese-making process described above, apparatus illustrated diagrammatically in FIGS. 3, 4 and 5 may be employed.

Reference will first be had to FIG. 3 showing a tank 1 containing cheese precursor or precheese which tank communicates with a heating unit 4 to which cheese precursor is pumped by a pump 3. The heating unit 4 communicates through a pipe 10 with the tank 8 of a mixer 9. A separate pipe 11 puts a vessel 5 containing rennet 6 into communication with the tank 8 of the mixer 9 to which rennet is pumped by pump 7. The tank 8 of the mixer 9 communicates through pipe 12 with the frustoconical lower end of a vertical cylinder 13 having a smooth-walled interior, for example, covered with polytetrafluoroethylene (PTFE) in order to reduce boundary layer phenomena, which cylinder has a tubular outer shell 15 defining an annular chamber along substantially the entire length of the cylinder. The annular chamber is supplied with liquid 28 which is ultrafiltrate or pasteurized whey with an acid pH, the density of the liquid is raised by the addition of dried ultrafiltrate or dried whey so that the density exceeds that of the curd slices. The cylinder 13 and the tubular shell 15 both open at their top ends into floatation tank 17, ultrafiltrate or pasteurized whey circulates continuously in a closed circuit from the floatation tank 17 by means of a pump 20 which draws the liquid 28 through pipe 18 to the bottom end of tubular shell 15 via a heat exchanger 19 which maintains the temperature of the liquid and may, if desired, pasteurize it. The annular chamber is provided with helical baffles, and it will also be noted that the annular chamber inlet conduit 21 at the bottom of the shell 15 is directly tangential to the shell so as to impart a rising helical movement to the liquid about the cylinder 13 thereby better distributing the transfer of heat. The liquid 28 returns to the floatation tank 17 at the top of the shell 15 through its open top end and via conduit 16 which delivers liquid 28 to the other end of the floatation tank 17.

At one side of the floatation tank 17 is mounted a cutting device 22 which may be operated by a power cylinder, the piston rod of which extends into the floatation tank 17 and is equipped with a cutter 23, comprising for example, a U-shaped support the ends of the opposed legs of which are joined by a cutting wire 31 (see FIGS. 4 and 5). The floatation tank 17 also has a first sheet metal perforate plate or grill 25 interconnecting the outlet end of the cylinder 13 with a second horizontal sheet metal perforate plate or grill 26 on which the curd slices are received before their transfer to a curing or ripening station.

Preferably there is provided at the frustoconical base of the cylinder 13 a divergent conical flow divider 14 (FIG. 4) which serves to distribute the incoming cheese precursor and rennet mixture along the cylinder wall. The divider 14 is surmounted by another, convergent, conical divider whose purpose is the same as the first but which, moreover, eliminates the dead zone which otherwise would have developed at the upper end of the divider 14. In FIG. 4, a heat insulating sheath 30 insulates the unit consisting of the cylinder 13 and the shell 15, and thermostats are distributed along the length of the cylinder to automatically control the temperature of the liquid 28 and the mixture of cheese precursor and rennet or product 27.

Parallel guide tracks 32 may be provided on the tank 17 (see FIGS. 4 and 5) for guiding the rings 24, which protect the freshly cut curd slices 29, between the outlet end of the cylinder 13 and the perforate plate 25; the rings are supported on the tracks 32 by lateral flanges 31. A slow motion displacement jack (not shown) is provided for pushing the rings 24 with the slices along the perforate plates 25 and 26. When the curd slices 29 are supported on the perforate plate 26, they are covered with a cover screen 34 and an aeration case 37 built into a housing 35 pivotally mounted about a horizontal pivot pin 36 journaled on the tank 17, the housing 35 may swing about its pivot axis to bring the aeration case 37 into position on its supports 33. Unillustrated means are provided for continuously removing aeration cases and transferring them to a curing or ripening station, which means may be conventional endless conveyors.

The apparatus which has just be described operates as follows:

The cheese precursor 1 contained in the tank 2 is pumped continuously into the tank 8 of the mixer 9 by the pump 3 via heating unit 4 where the cheese precursor is heated to a temperature higher than the selected coagulation temperature; simultaneously a measured quantity of rennet is conveyed to the tank 8 over pipe 11 by means of pump 7. The cheese precursor and rennet are intimately mixed in the tank 8 and expelled through pipe 12 into the bottom of the cylinder 13 where the divider 14 divides the continuous flow of the intimate mixture of cheese precursor and rennet and distributes the mixture along the interior wall of the cylinder, which wall is heated by the rising helical circulation of the liquid 28 entering through the tangential conduit 21 into the shell 15. The intimate mixture moves slowly and at constant speed upwards in the cylinder 13 in which it coagulates, its coagulation front being substantially plane and horizontal for forming a cylindrical mass of curd which continuously moves up into the floating tank. Here the cylindrical mass of curd is cut into slices 29 of thickness substantially equal to the desired cheese by rapid movement of the wire blade cutter 31 about level with the outlet of the coagulation cylinder, which movement is effected at intervals of constant frequency. After cutting, the curd slices 28 separate from the cylindrical mass of curd 27 by the force of buoyancy which lifts them into the ring or hoop 24 directly above and in axial alignment with the coagulation cylinder. It will be noted that the lifting of the slices in the rings is effectively guided by the cylindrical mass of curd slightly enterring the lower open end of the ring or hoop before the corresponding slice is cut. When the slice slightly entering the ring or hoop is cut, a slow speed displacement system (not illustrated) pushes the ring or hoop 24 the flange 31 of which slides along the guide and support tracks until it comes into position on the perforate plate 26, which is spaced from the bottom of the tank 17 by supports 33, after having moved up and along the first perforate plate 25.

When a predetermined number of hooped slices 29 have come into position on the second perforate plate 26, the cover screen 34 and the aeration case 37 are at rest thereon; the unit consisting of the second perforate plate 26, slices 29, hoops or rings 24, cover screen 34 and aeration case 37 is swung over about the pivot pin 36, which is made possible by the pivoting housing 35, then transferred towards a curing or ripening station, for example by a conveyor.

The present invention which combines the parameters of viscosity liquid mixture inflow rate, the distribution of streamlets of liquid along the wall of the coagulation cylinder, the laminar flow of these streamlets and the temperature distribution in the mass in motion provides a truly continuously manufacture of cheese from ultrafiltration of milk to the curing or ripening of curd slices.

The scope of the invention is of course not limited to the previously disclosed non limiting preferred mode of carrying out the process and embodiment of the apparatus; it also covers all modifications or variations in the domain of execution which lie within the skills of the man in the art.

Accordingly, the coagulation cylinder does not have to be vertical but may be oriented horizontally or inclined, the floatation tank 17 in such a case being located relative to the inclination of the coagulation cylinder. Similarly, the apparatus described one coagulation cylinder, but it is evident that for an industrial operation provision for a battery of coagulation cylinders will be made, all of the coagulation cylinders opening into the same or separate floatation tanks. Likewise these plural cylinders may each have a shell 15 or they may be groups in a single shell like heat exchanger tubes of a steam generator. When plural coagulation cylinders are provided, there will also be plates equipped with a plurality of rings or hoops 24 arranged in such a manner that each will be in vertical axial alignment with the outlet of its corresponding cylinder.

In a practical example of the application of the apparatus according to the invention, the coagulation cylinder had a height of about 3 meters. Such a cylinder makes it possible to process about 30 liters/hour of ultrafiltration retentate. In case a soft cheese as Camembert type cheese is to be produced a minimum hourly production in the order of a hundred cheeses may be attained. An industrial unit may comprise 24 or 25 coagulation cylinders such as disclosed herein which makes a total output of 2500 cheeses an hour possible. In such a plant 5000 liters of milk can be treated an hour. The production rate will be 24 or 25 cheeses every approximately 30 seconds, depending on the number of coagulation cylinders.

The stay time in the coagulation cylinder is about 40 to 50 minutes which breaks down into a setting time of the order of 8 to 10 minutes and consolidating period permitting the exiting curd to be solid yet malleable and resistant to the cutting action. The cheese precursor and rennet mixture is injected at the coagulation temperature into the cylinder with its temperature control shell and maintained at a slightly lower temperature. This temperature difference allows, as previously explained in detail, coagulation speed gradiant inside the coagulation cylinder to be eliminated. By using ultrafiltrate or whey or another alimentary liquid of suitable density for use as the floatation liquid in the floatation tank and the temperature control liquid, an elevated circulation rate is effected to equalize heat exchange. In the example given above, the circulation flow rate was in the order of 3000 liters/hour.

The invention applies to numerous types of cheeses and especially cheeses which are retailed whole; namely, soft cheeses of the Camembert or Coulommiers type, uncooked semi-hard cheese of the Edam, Mimolette or St Paulin type or cooked hard cheeses of the Gruyere type. Of course the invention is not limited to the examples which have just been given strictly by way of illustration.

What we claim is:

1. A process for the manufacture of cheese comprising the steps of: ultrafiltrating milk or a milk product capable of transformation into cheese until a retentate has been obtained whose solid content is about that of the cheese to be made; adding additional constituents to said retentate to obtain a liquid mixture whose solids content and fat to solids ratio are substantially those of the desired cheese; continuously intimately mixing the mixture with rennet and adjusting the temperature of the resulting mixture so that it is higher than the selected temperature of coagulation; continuously introducing the mixture whose temperature is higher than the selected coagulation temperature into an elongate coagulation cylinder having a smooth-walled interior and an interior cross section having substantially the cross section of the cheese being produced; controlling the rate of flow of the mixture being introduced into said cylinder so that the flow of mixture as it progresses through the cylinder is laminar at all points; causing said mixture to coagulate as it passes through said cylinder in the direction of the longitudinal axis thereof while effecting a substantially plane coagulation front at right angles to the longitudinal axis of the coagulation cylinder by maintaining the interior wall of the coagulation cylinder at a temperature below that of the selected temperature of coagulation, the temperatures of the incoming mixture and of the coagulation cylinder being such that the portions of the mixture nearer the center of the cylinder coagulate more quickly than the portions adjacent to the interior wall; cutting slices of curd from said coagulate leaving the coagulation cylinder at the outlet of the coagulation cylinder and transferring the slices of curd having substantially the composition and ultimate shape of the cheese produced directly to a ripening station.

2. A process according to claim 1, wherein the liquid mixture and rennet is introduced so that it progresses along the interior wall of the coagulation cylinder before the actual coagulation takes place.

3. A process according to claim 2, comprising separating the cut slices of curd from the mass of curd leaving the coagulation cylinder and conveying them by floatation in a bath of floatation liquid.

4. A process according to claim 3, further comprising pasteurizing the floatation liquid for the bath and lowering the pH thereof so as to limit the proliferation of harmful bacteria.

5. A process according to claim 4, wherein the floatation liquid is a liquid having a density at least equal to that of the slice or curd.

6. A process according to claim 3, further comprising circulating the floatation liquid around the coagulation cylinder to maintain its interior wall at the desired temperature, and recycling the floatation liquid back to the bath.

7. A process according to claim 6, comprising hooping the slices of curd cut at the outlet of the coagulation cylinder before their transfer to the ripening station.

8. A process according to claim 7, wherein the floatation liquid is either ultrafiltrate resulting from the ultrafiltration to which dried ultrafiltrate or dried whey is added to raise the density of the ultrafiltrate; or whey.

* * * * *